United States Patent
Cowap

(10) Patent No.: US 10,247,172 B2
(45) Date of Patent: Apr. 2, 2019

(54) SELF ORIENTING HANGING WINDMILL

(71) Applicant: Stephen F. Cowap, Ballwin, MO (US)

(72) Inventor: Stephen F. Cowap, Ballwin, MO (US)

( * ) Notice: Subject to any disclaimer, the term of this patent is extended or adjusted under 35 U.S.C. 154(b) by 0 days.

(21) Appl. No.: 15/291,790

(22) Filed: Oct. 12, 2016

(65) Prior Publication Data

US 2017/0030334 A1  Feb. 2, 2017

Related U.S. Application Data

(63) Continuation of application No. PCT/US2015/022702, filed on Mar. 26, 2015.

(60) Provisional application No. 61/970,682, filed on Mar. 26, 2014.

(51) Int. Cl.

| F03D 13/20 | (2016.01) |
| F03D 9/00 | (2016.01) |
| F03D 7/02 | (2006.01) |
| F03D 1/06 | (2006.01) |
| F03D 9/25 | (2016.01) |

(52) U.S. Cl.
CPC ........... F03D 13/20 (2016.05); F03D 1/0608 (2013.01); F03D 1/0625 (2013.01); F03D 7/02 (2013.01); F03D 9/25 (2016.05); *F05B 2220/706* (2013.01); *F05B 2240/2213* (2013.01); *F05B 2240/917* (2013.01); *F05B 2250/70* (2013.01); *Y02E 10/721* (2013.01); *Y02E 10/723* (2013.01); *Y02E 10/725* (2013.01); *Y02E 10/728* (2013.01)

(58) Field of Classification Search
CPC .......... F03D 13/20; F03D 9/25; F03D 1/0608; F03D 1/0625; F03D 7/02; F05B 2220/706; F05B 2240/2213; F05B 2240/917; F05B 2250/70; Y02E 10/721; Y02E 10/723; Y02E 10/725; Y02E 10/728
USPC ......................................................... 290/55
See application file for complete search history.

(56) References Cited

U.S. PATENT DOCUMENTS

| 4,166,596 A | * | 9/1979 | Mouton, Jr. | B64B 1/50 244/30 |
| 4,217,501 A | * | 8/1980 | Allison | F03D 13/20 290/55 |
| 4,470,563 A | * | 9/1984 | Engelsman | F03D 9/25 244/33 |
| 4,491,739 A | * | 1/1985 | Watson | F03D 13/20 290/44 |
| 4,894,554 A | * | 1/1990 | Farmer | F03D 13/20 290/55 |
| 5,435,259 A | * | 7/1995 | Labrador | B01D 61/10 114/39.31 |
| 5,484,120 A | | 1/1996 | Blakeley et al. | |

(Continued)

FOREIGN PATENT DOCUMENTS

RU  2032831 C1  4/1995

OTHER PUBLICATIONS

Translation of RU2032831C1 made Jul. 13, 2015.
(Continued)

*Primary Examiner* — Abdullah A Riyami
*Assistant Examiner* — Joseph Ortega
(74) *Attorney, Agent, or Firm* — Grace J. Fishel

(57) ABSTRACT

A hanging windmill has a wind turbine and a generator mounted on an airframe supported by a hanger at the center of gravity of the assembly. A stop is provided for preventing the tipping of the airframe on the hanger beyond a point where the blades of the wind turbine strike the hanger.

8 Claims, 3 Drawing Sheets

(56) References Cited

U.S. PATENT DOCUMENTS

| | | | | |
|---|---|---|---|---|
| 6,327,994 B1* | 12/2001 | Labrador | ............... | B01D 61/10 |
| | | | | 114/382 |
| 2006/0233635 A1* | 10/2006 | Selsam | .................. | F03D 1/065 |
| | | | | 415/4.3 |
| 2010/0026007 A1* | 2/2010 | Bevirt | ..................... | B64C 31/06 |
| | | | | 290/55 |
| 2013/0115068 A1* | 5/2013 | Borgen | ................ | F03D 1/0658 |
| | | | | 415/191 |

OTHER PUBLICATIONS

International Search Report and Written Opinion of International Searching Authority in priority International Patent Application No. PCT/US2015/022702.

\* cited by examiner

Fig. 1  Wind

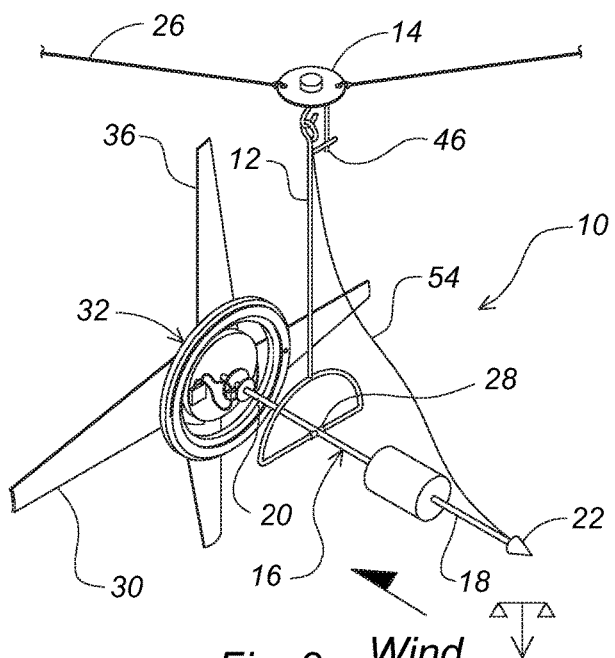
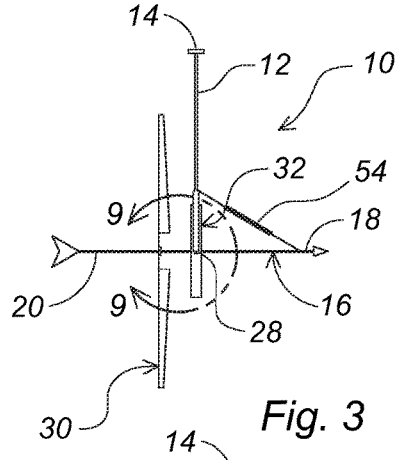
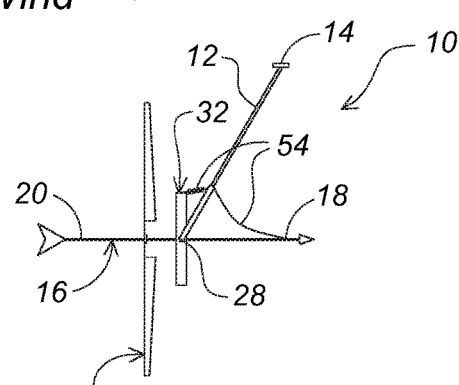
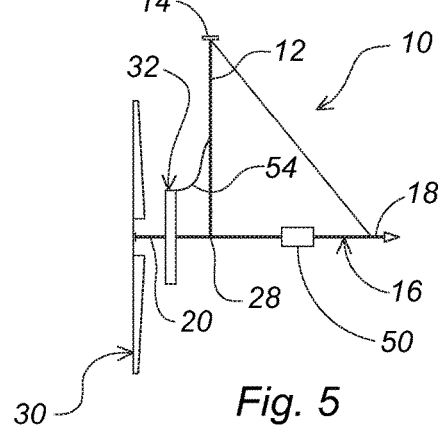
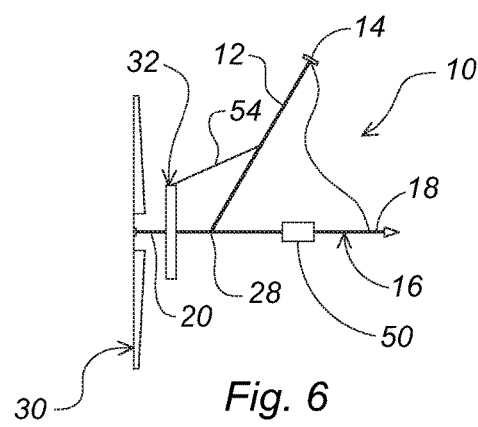

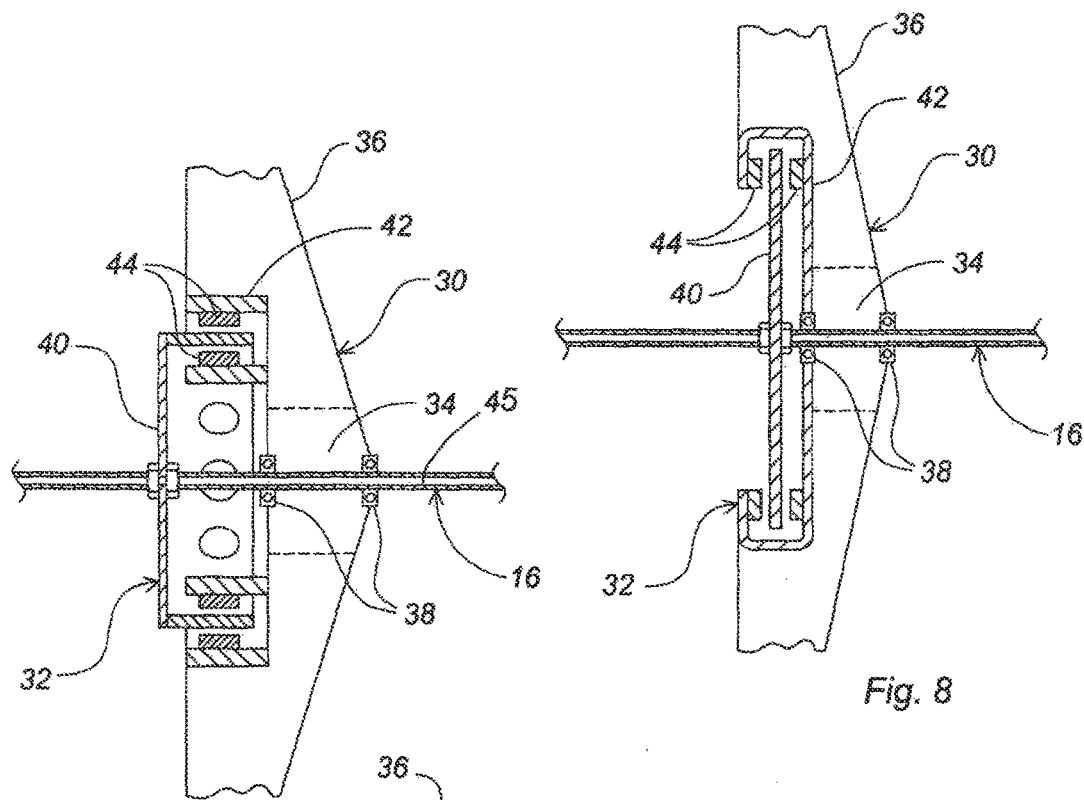
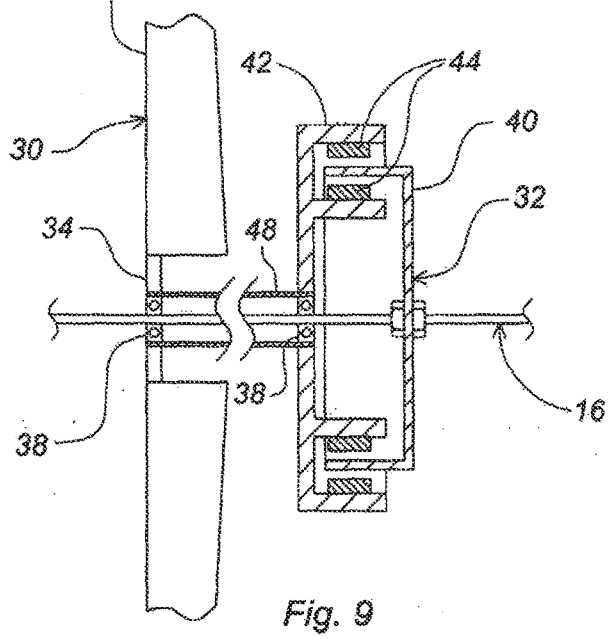

SELF ORIENTING HANGING WINDMILL

BACKGROUND OF THE INVENTION

1. Field of the Invention

The present invention relates to a windmill which may be hung from a wire or fixed overhead attachment point and does not require a tower.

2. Brief Description of the Prior Art

Existing windmills are mounted on towers which are expensive to construct and maintain. Windmill towers are prohibited in many areas by ordinance and may be shut down because of public complaints. In addition, windmills are often struck by lightning because they are sited in the open and made tall to reach higher velocity wind. When they are damaged, the maintenance costs are often not justified by the small amount of power being produced.

BRIEF SUMMARY OF THE INVENTION

In view of the above, it is an object of the present invention to provide a hanging windmill that may be hung from a wire or overhead attachment point, and does not require a tower. It is another object to provide a hanging windmill that can be easily lowered for maintenance or in advance of a storm, or to be made in a small and portable form for transportable use. It is also an object to provide a hanging windmill that may be easily moved without loss of a tower or footer investment. Other objects and features of the invention will be in part apparent and in part pointed out hereinafter.

In accordance with the invention, a hanging windmill is provided in the form an elongated member with a windward and leeward end. A wind turbine/electrical generator unit is mounted on the elongated member which is suspended by the hanger at its center of gravity. A stop is provided to prevent downward tipping of the elongated member beyond a point that the blades of the wind turbine would contact the suspension hanger.

The invention summarized above comprises the constructions hereinafter described.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which:

FIG. 1 is a perspective view of a hanging windmill in accordance with the present invention;

FIG. 2 is a perspective of second hanging windmill in accordance of the present invention;

FIG. 3 is a schematic view of a third hanging windmill at rest;

FIG. 4 is a view of the windmill of FIG. 3 blowing in the wind;

FIG. 5 is a view of a fourth hanging windmill at rest;

FIG. 6 is a view of the windmill of FIG. 5 blowing in the wind;

FIG. 7 is a detail showing a generator with a cylinder stator and a generator rotor embedded in a turbine rotor;

FIG. 8 is a detail showing a generator with a disk stator and a generator rotor embedded in a turbine rotor; and, FIG. 9 is a detail taken along section line 9-9 in FIG. 3 showing a drive shaft connecting the turbine rotor with the generator rotor.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1A:
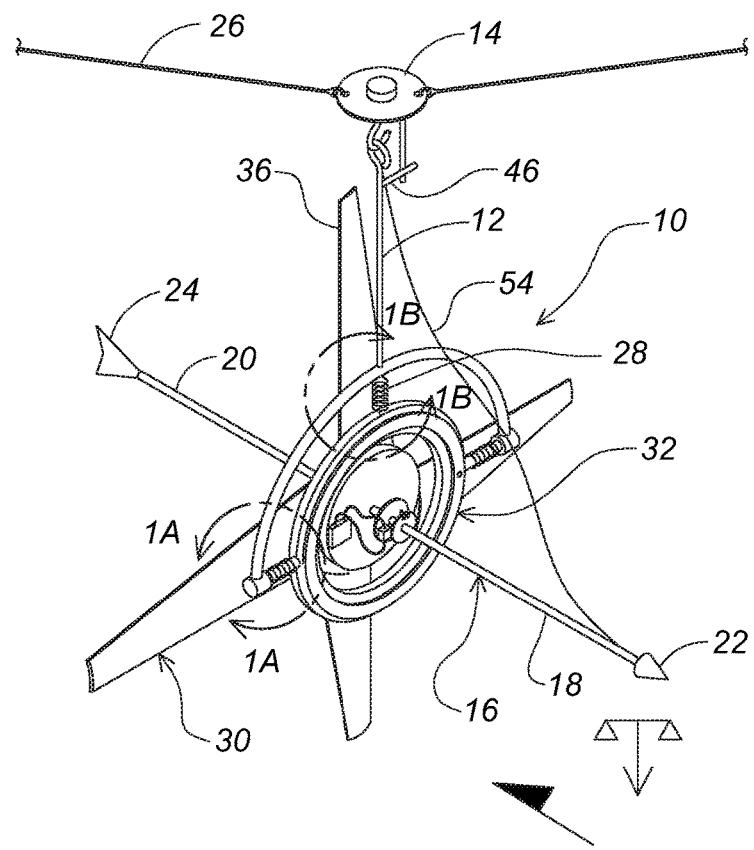
FIG. 1A is a detail on an enlarged scale taken along line 1A-1A in FIG. 1.
Figure 1A:
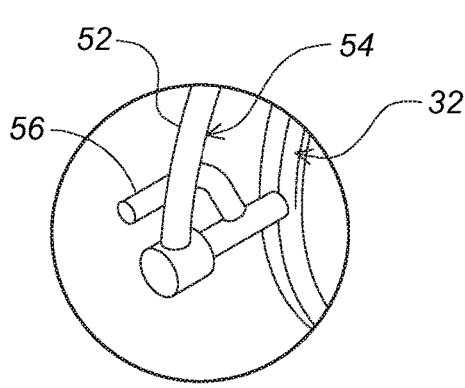

Referring to the drawings more particularly by reference character, reference numeral 10 refers to a hanging windmill apparatus. As illustrated, windmill 10 is suspended by a hanger 12 such as a strut, wire, cable or the like from a U-joint or swivel 14 and includes an elongated airframe or gooseneck 16 with a windward end 18 and a leeward end 20. A head 22 is provided on the windward end 18 and a tail 24 on the leeward end 20 of airframe 16. The U-joint or swivel 14 may be supported from overhanging wires 26 as shown in FIGS. 1-2 or from an overhanging structure such as a ledge, porch, etc. Airframe 16 is supported by hanger 12 at its center of gravity 28 of the assembly such that in neutral position airframe 16 is perpendicular to hanger 12 and generally parallel to the ground.

A wind turbine 30 and a generator 32 for generating electrical energy are mounted on airframe 16. Wind turbine 30 comprises a turbine rotor 34 with rotor blades 36 extending in a direction radially outwardly. Turbine rotor 34 is rotatably mounted on airframe 16 with bearings 38. Generator comprises a stator 40 fixedly coupled to airframe 16 and a generator rotor 42 coupled to turbine rotor 34. As seen in FIGS. 7 and 8 generator rotor 42 comprises a housing embedded in turbine rotor 34. A plurality of permanent magnets 44 is attached to the inside of housing and rotates with rotor blades 36. Stator 40 includes an electrical coil so that when magnets 44 are rotated over stator 40 an electrical current is generated. Stator coils may be in a cylinder as shown in FIG. 7 or in a disk as shown in FIG. 8. There are advantages in this design over existing generator designs. First, magnets 44 may be placed on a large diameter annular housing with an open face, thereby passing them at higher velocity over the coils. Second, the coils within generator 32 produce heat which may cause magnets 44 such as rare earth magnets to lose their magnetic field. The large diameter, open face nature of the design shown in FIGS. 7-8 allows for maximum heat dissipation at high power output so that magnets 44 are not damaged by the heat. As blades 36 rotate, the current may be passed a hollow channel 45 in airframe 16 and hanger 12 or through cabling paralleling airframe 16 and support hanger 12 for immediate use or storage. When current is taken from hanging windmill, a stop 46 may be provided on U-joint or swivel 14 to prevent rotation of the hanging windmill 10 around hanger 12 beyond 360 degrees. In other embodiments, as shown in FIGS. 3-6, wind turbine 30 and generator 32 may be spaced apart on airframe 16 and coupled with a drive shaft 48 as shown in FIG. 9. As with the versions shown in FIGS. 7 and 8, turbine rotor 34 drives generator 32 to produce electricity.

As shown in the drawings wind turbine 30 is positioned on the leeward end of airframe 16 as this adds to the directional stability of the airframe. A windward end-mounted wind turbine 30 is possible although it would require a large tail 24 or counterweight 50 to achieve directional stability. Also, as shown in the drawings, generator 32 is positioned on the leeward end of airframe 16 but may be positioned on the windward side if desired.

In FIG. 1, generator 32 is suspended on hanger 12 by a bail 52 and generator rotor 42 is embedded in turbine rotor 34. In FIG. 2, windmill 10 is hung by bail 52 with wind turbine 30 and generator 32 on the leeward end 20 of airframe 16 and counterweight 50 on the windward end 18 such that the windmill hangs perpendicular to hanger 12 and parallel to the ground in neutral position. In FIGS. 3-4, wind turbine 30 and generator 32 are spaced apart along airframe 16 with generator 32 at the point of attachment of hanger 12 whereas in FIGS. 5-6 generator 32 is offset from the attachment point of hanger 12 to airframe 16 which may require the addition of more mass to counterweight 50 depending on where hanger 12 attached to airframe 16.

Figure 1B:
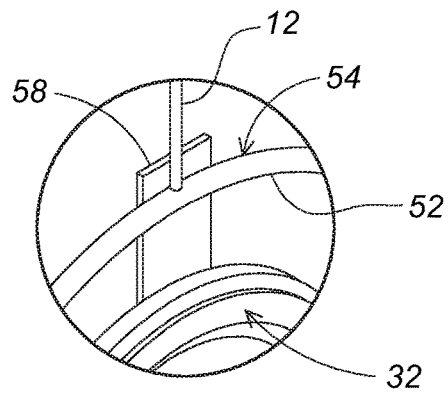
FIG. 1B is a detail on an enlarged scale taken along line 1B-1B in FIG. 1.

To prevent blades 36 from contacting support hanger 12 in the wind, a stop 54 is provided to prevent tipping beyond a preset amount. Stop 54 as shown in FIGS. 1 and 2 is a lanyard, chain, strut, spring, hydraulic cylinder or combination thereof, generally referred as "lanyard," is attached between hanger 12 and airframe 16. When wind turbine/generator is mounted on airframe 16 at the center of gravity as shown in FIG. 1, stop 54 attaches between hanger 12 and windward end 18 of airframe 16. Stop 54 has a length such that airframe 16 cannot tip on hanger 12 beyond a preset amount to prevent blades 36 from contacting support hanger 12. Other stops 54 may be used such as shown in FIG. 1A and FIG. 1B. In FIG. 1A, an L-shaped finger 56 contacts bail 52 to prevent over rotation of wind turbine/generator in bail 52. As shown in FIG. 1B, an upstanding tab 58 on generator 32 serves to stop rotation of wind turbine/generator in bail 52. Other possible stops 54 are shown in FIGS. 3-4 where wind turbine 30 is mounted towards leeward end 20. In FIG. 3, stop 54 is shown as a spring and generator 32 is mounted at the center of gravity 28 whereas in FIG. 4 stop 54 is an elongated member assisted by a spring attached to generator 32. In FIGS. 5-6 both wind turbine 30 and generator 32 are positioned leeward 20 of center of gravity 28 and stop 54 is attached between generator 32 and hanger 12.

In use, hanging windmill 10 becomes more stable with increasing blade speed because of increased angular momentum. When the wind dies or reverses quickly, hanging windmill 10 moves forward and goes nose up or becomes erratic in flight. This is not a problem, as blades 36 do not strike support hanger 12. When airframe 16 is parallel with the ground, stop 54 is slack but when airframe 16 points downward, blades 36 may catch more wind than tower mounted windmills which can only rotate 360 degrees in a horizontal plane and must be held in that plane to avoid the blades striking the tower. Some movement of airframe 16 downward is permitted but is checked by stop 54 such that blades 36 do not strike support hanger 12.

Because hanging windmill 10 hangs freely, blades 36 have no tower to strike and they may be made longer than with existing designs because they straighten as they speed up due to centrifugal force and have nothing to strike behind them. Also, because the device is self-orienting in three dimensions, it may point upwards or downwards from the horizontal plane to collect more wind than existing tower supported designs which are fixed on a vertical axis of rotation.

While large hanging windmills 10 may be regulated by local building codes, below a certain physical size, voltage and power output maximum, a permit may not be required. Smaller hanging windmills 10 may be hung from a porch or tree branch or from a clothesline. A mountain climber could easily carry and deploy a small windmill which at high altitude could produce enough power to run a heater strip, melt snow for water to drink, and charge a cell phone to call for help if stranded. Windmills 10 may make medical, military and scientific monitoring in remote locations possible. Hanging windmills 10 may also be used to power a billboard or advertisement where power is not available or difficult to obtain. Hanging windmills 10 may be used to provide power for video surveillant in border patrol and subsequent transmission of images back through the internet. Hanging windmills 10 may be lofted to a high altitude on a balloon or a kite to catch higher velocity wind and if tethered the current generated passed back to ground. As will be apparent, the foregoing uses only touch on the possibilities.

In the above description, numerous specific details are set forth such as examples of some embodiments, specific components, devices, methods, in order to provide a thorough understanding of embodiments of the present disclosure. It will be apparent to a person of ordinary skill in the art that these specific details need not be employed, and should not be construed to limit the scope of the disclosure. In the development of any actual implementation, numerous implementation-specific decisions must be made to achieve the developer's specific goals, such as compliance with system-related and business-related constraints. Such a development effort might be complex and time consuming, but is nevertheless a routine undertaking of design, fabrication, and manufacture for those of ordinary skill. Hence as various changes could be made in the above constructions without departing from the scope of the invention, it is intended that all matter contained in the above description or shown in the accompanying drawings shall be interpreted as illustrative and not in a limiting sense.

What is claimed:

1. A free hanging balanced windmill comprising:
    an airframe having a windward and leeward end
    a wind turbine comprising a turbine rotor with blades rotatably mounted on the leeward end of the airframe;
    a generator with a stator supported by the airframe and a generator rotor operatively connected to the turbine rotor;
    a single supporting hanger strut attached to a center of gravity of the airframe with the wind turbine and generator mounted thereon, said hanger strut supporting the airframe such that the airframe may tip with respect to the hanger strut and in a neutral position the airframe is perpendicular to the hanger strut and parallel to the ground; and, a stop means comprising a first part on the windward end and a second part on the leeward end of the airframe adapted to prevent tipping of the airframe on the hanger strut such that the blades of the turbine rotor do not strike the hanger strut, said first and second parts of the stop means comprising a lanyard, a finger or a tab positioned between the hanger strut and the windward end and leeward end of the airframe and configured to prevent tipping of the airframe beyond a preset amount.

2. The hanging windmill of claim 1 wherein the generator rotor is embedded in the turbine rotor.

3. The hanging windmill of claim 1 wherein a drive shaft connects the generator rotor to the turbine rotor for rotation therewith.

4. The hanging windmill of claim 1 wherein electricity generated by the generator is passed from the stator through a hollow channel in the airframe and hanger for immediate use or storage.

5. The hanging windmill of claim 1 wherein the generator is suspended in a bail connected to the hanger strut, said L-shaped finger is attached to the generator for contact with the bail.

6. The hanging windmill of claim 1 wherein the generator is suspended in a bail connected to the hanger strut, said tab is on the generator for contact with the hanger strut.

7. The hanging windmill of claim 1 wherein the generator rotor comprises a large diameter annular housing with an open face to allow for heat dissipation and with a plurality of rare earth magnets mounted around a circumference of the housing.

8. The hanging windmill of claim 7 wherein stator has electric coils mounted on a cylinder or disk.

* * * * *